United States Patent [19]

Iwami et al.

[11] Patent Number: 5,315,705
[45] Date of Patent: May 24, 1994

[54] COMMUNICATION ADDRESS MANAGEMENT SYSTEM

[75] Inventors: Naoko Iwami; Susumu Matsui, both of Machida; Toru Saito, Yamoto, all of Japan

[73] Assignee: Hitachi, Ltd., Tokyo, Japan

[21] Appl. No.: 833,678

[22] Filed: Feb. 11, 1992

[30] Foreign Application Priority Data

Feb. 25, 1991 [JP] Japan .................. 3-29801

[51] Int. Cl.5 ............................... G06F 13/00
[52] U.S. Cl. .................................... 395/200
[58] Field of Search ............... 370/110.1, 94.1; 395/200

[56] References Cited

U.S. PATENT DOCUMENTS

4,930,123  5/1990  Shimizu ..................... 370/94.1
5,067,154  11/1991  Hosobuchi et al. ............... 380/25

FOREIGN PATENT DOCUMENTS

64-27348  1/1989  Japan .

Primary Examiner—Robert L. Richardson
Attorney, Agent, or Firm—Fay, Sharpe, Beall, Fagan, Minnich & McKee

[57] ABSTRACT

An address management system which is integrally compatible to an plurality of communication services and a plurality of communication application programs, and a communication terminal which utilizes such an address management system are disclosed. The address management system comprises type of communication service table and address management table which stores a number of identification information of communication destinations and types of communication services available to the communication destinations and associated communication addresses, a request acceptance unit for accepting a communication address inquiry request command, a type of communication service discrimination unit which discriminates a type of communication service which the communication application program of the communication address inquiry requestor uses, a communication address retrieval unit which searches the address management table to retrieve a communication address in accordance with identification information of the communication address inquiry request and the discriminated type of communication service, and a response unit which sends the retrieved communication address back to the communication address inquiry requestor. A proper communication address can be obtained by merely designating the terminal name of the destination terminal by the communication application program without identifying the type of communication service.

15 Claims, 20 Drawing Sheets

FIG. 4

| NAME OF COMMUNICATION APPLICATION PROGRAM ~32 | TYPE OF COMMUNICATION SERVICE ~33 |
|---|---|
| TELEPHONE CONTROL | VOICE |
| ELECTRONIC MAIL | DATA |
| FILE TRANSFER | DATA |
|  |  |
|  |  |
|  |  |

101
TYPE OF COMMUNICATION SERVICE TABLE

FIG. 5

| TERMINAL NAME ~28 | COMMUNICATION ADDRESS (VOICE COMMUNICATION SERVICE) ~30 | COMMUNICATION ADDRESS (DATA COMMUNICATION SERVICE) ~31 | ...... |
|---|---|---|---|
| A | 03-3111-1111 | 4567890123423 6734 | |
| B | 044-444-5555 | — | |
| C | — | 4234567890998 3167 | |
|  |  |  | |
| q | 03-3222-2222 | 4562892122423 3656 | |
| z | — | 4234564840443 3646 | |

19
ADDRESS MANAGEMENT TABLE

FIG. 6
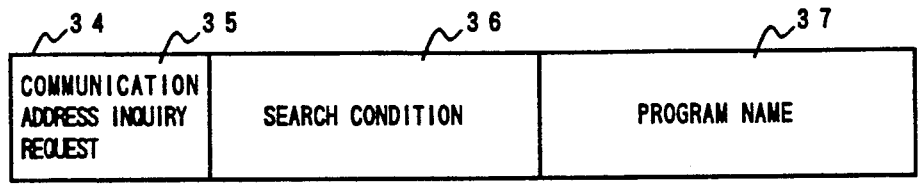
FIG. 7
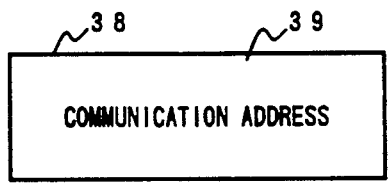
FIG. 8
| USER NAME | ADDRESS | COMMUNICATION ADDRESS 1 | TYPE OF COMMUNICATION SERVICE | COMMUNICATION ADDRESS 2 | TYPE OF COMMUNICATION SERVICE | ...... |
|---|---|---|---|---|---|---|
| A | TOKYO | 03-3111-1111 | VOICE | 03-3444-9999 | VOICE | |
| B | KAWASAKI | 044-444-5555 | VOICE | | | |
| C | KYOTO | 12345678909983167 | DATA | | | |
| ⋮ | ⋮ | ⋮ | ⋮ | ⋮ | ⋮ | |
| q | TOKYO | 03-3222-2222 | VOICE | 25628921224233656 | DATA | |
| z | YOKOHAMA | 42345648404436646 | DATA | 90035187532 | DATA | |
19A
ADDRESS MANAGEMENT TABLE

FIG. 10

| 38A | 59 | 39 | 39 | |
|---|---|---|---|---|
| | NUMBER OF ADDRESSES | COMMUNICATION ADDRESS | COMMUNICATION ADDRESS | ... |

FIG. 17

| USER NAME ~93 | ADDRESS ~94 | COMMUNICATION ADDRESS 1 ~57 | TYPE OF COMMUNICATION SERVICE ~58 | TIME ~63 | COMMUNICATION ADDRESS 2 ~57 | TYPE OF COMMUNICATION SERVICE ~58 | TIME ~63 |
|---|---|---|---|---|---|---|---|
| A | TOKYO | 03-3111-1111 | VOICE | MON – FRI 09:00~17:00 | 03-3444-9999 | VOICE | 20:00~07:00 |
| B | KAWASAKI | 044-444-5555 | VOICE | 08:40~17:30 | | | |
| C | KYOTO | 11234567890909983167 | DATA | 10:00~23:00 | | | |
| ... | | | | | | | |
| q | TOKYO | 03-3222-2222 | VOICE | SAT – SUN | 25628921224233656 | DATA | |
| z | YOKOHAMA | 42345648404436646 | DATA | | 90035187532 | DATA | |

19B ADDRESS MANAGEMENT TABLE

FIG. 22

| ITEM NO. | NAME | ADDRESS |
|---|---|---|
| 1 | A | 03-3111-1111 |
| 2 | B | 044-444-5555 |
| 3 | S | 0555-99-8888 |
| 4 | PPP | 03-3666-9999 |
| 5 | UU | 045-566-8888 |
| 6 | q | 03-3222-2222 |

TELEPHONE

TELEPHONE NUMBER :

FIG. 23

ELECTRONIC MAIL

[ADDRESS]

NAME 1 :

NAME 2 :

| ITEM NO. | NAME | ADDRESS |
|---|---|---|
| 1 | C | 1234567890 9983167 |
| 2 | q | 2562892122 4233656 |
| 3 | z | 4234564840 4436646 |
| 4 | z | 900351 87532 |
| 5 | ZX | 3197266647 84485 |
| 6 | ZXY | 6545646781 34846 |

COMMUNICATION ADDRESS MANAGEMENT SYSTEM

BACKGROUND OF THE INVENTION

The present invention relates to an address management system and a communication terminal, and more particularly to an address management system and a communication terminal useful in a complex communication network.

An example of a prior art address management system in one disclosed in JP-A-64-27348.

In the disclosed address management system, a terminal connected to a telephone network stores a number of communication addresses of designation terminals in accordance with a communication address architecture defined by the communication network, displays the communication addresses on a screen so that an operator may select one of the communication addresses on the screen, and delivers the selected communication address to a telephone set with an automatic calling function to make a call.

The prior art address management system assumes the execution of one communication service and one communication application program and no consideration is paid to the execution of a plurality of communication services or a plurality of communication application programs.

Where a plurality of communication services or communication application programs are involved, it is necessary to provide separate address management systems for the respective services or programs, and the information stored is duplicate and the configuration is too complex.

SUMMARY OF THE INVENTION

It is an object of the present invention to provide an address management system which is integrally compatible to a plurality of communication services and a plurality of communication application programs.

It is another object of the present invention to provide a communication terminal which utilizes such an address management system.

The address management system of the present invention comprises communication address data storage means for storing a number of identification information of communication destination and type of communication services available to the communication destinations and associated communication addresses, communication address inquiry request acceptance means for accepting a communication address inquiry request, type of communication service discrimination means for discriminating a type of communication service which the communication address inquiry requestor uses, communication address retrieval means for searching the communication address data storage means to retrieve a communication address in accordance with identification information of the communication address inquiry request and the discriminated type of communication service, and response means for sending the retrieved communication address back to the communication address inquiry requestor.

In the address management system of the present invention, when the communication address inquiry acceptance means accepts the communication address inquiry request through an interface, the type of communication service discrimination means discriminates the type of communication service available to the communication address inquiry requestor. Then, the communication address retrieval means searches the communication address data while using the identification information associated with the communication address inquiry request and the discriminated type of communication service as keys. Since the communication address data storage means stores a number of identification information of the communication destinations, types of communication services available and communication addresses registered in association with one another, the communication addresses of the communication services by the communication destinations to the communication address inquiry requestor can be exactly retrieved.

The present address management system is well adaptable to a plurality of communication address inquiry requestors of different types of communication service.

BRIEF DESCRIPTION OF THE DRAWINGS

FIG. 4 shows a table of types of available communication services;

FIG. 5 shows an address management table;

FIG. 6 shows a communication address inquiry request command;

FIG. 7 shows a response command;

FIG. 8 shows another address management table;

FIG. 10 shows a response command for the process of FIG. 9;

FIG. 17 shows an address management table used by the address management system of FIG. 16;

FIG. 22 shows a display screen in a step 66 of FIG. 21;

FIG. 23 shows another display screen in the step 66 of FIG. 21; and

DESCRIPTION OF THE PREFERRED EMBODIMENTS

The preferred embodiments of the present invention are now explained, although the present invention is not limited thereto.

Figure 1:
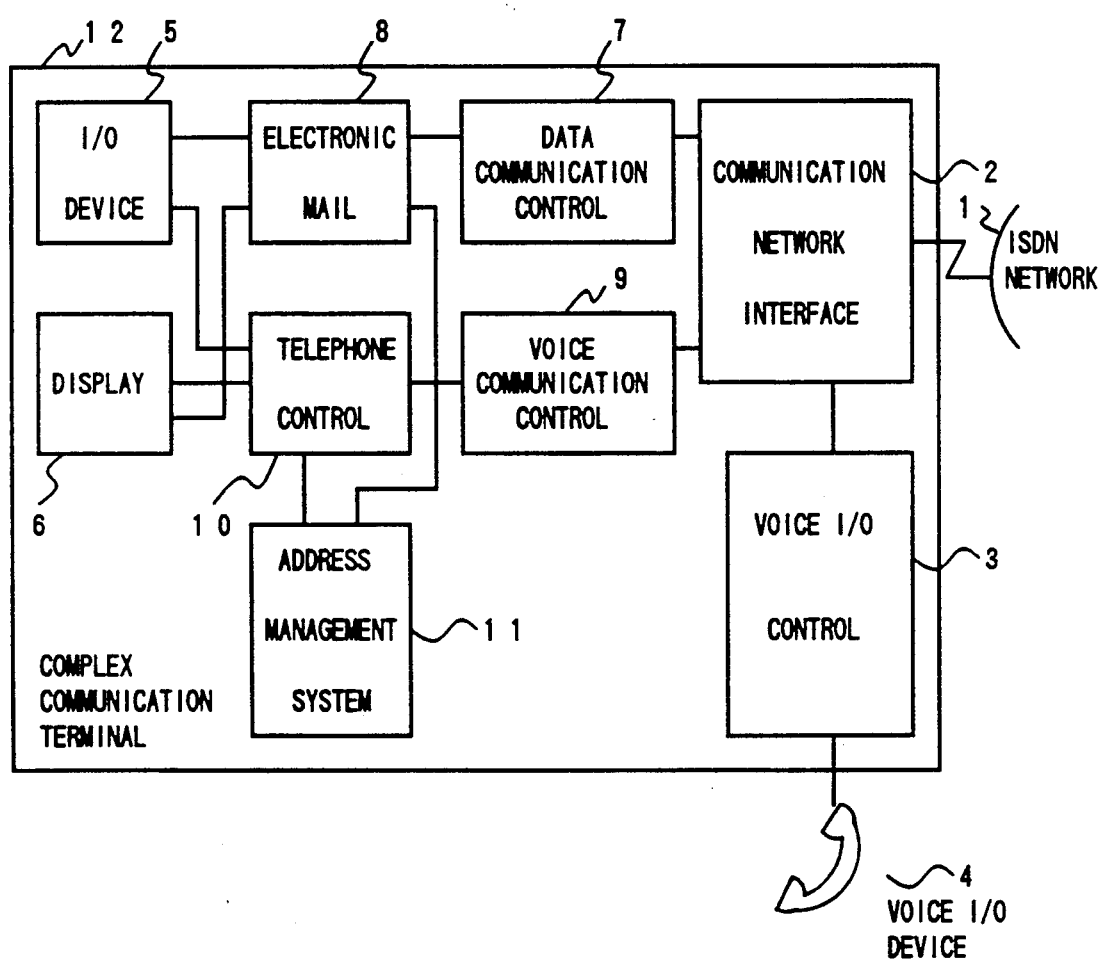
FIG. 1 shows a configuration of a first embodiment of an address management system of the present invention.

FIG. 1 shows a configuration of a first embodiment of the address management system of the present invention.

A complex communication terminal 12 may use two types of communication service, a data communication service and a voice communication service, through an ISDN network 1.

Numeral 2 denotes a communication network interface control unit which interfaces with the ISDN network. Numeral 3 denotes a voice input/output control unit for inputting and outputting a voice signal from and to a voice input/output device 4, numeral 5 denotes an input device for accepting a process request from a user, and numeral 6 denotes a display device.

Numeral 7 denotes a data communication control unit for providing a data communication service, and numeral 8 denotes a first communication application program which is, in the present embodiment, an electronic mail program for exchanging mails among users by utilizing the data communication service.

Numeral 9 denotes a voice communication control unit which provides a voice communication service, and numeral 10 denotes a second communication application program which is a telephone control program for providing a telephone function by utilizing the voice communication service.

Numeral 11 denotes the address management system of the present invention which provides information in accordance with a request from the communication application program.

Figure 2:
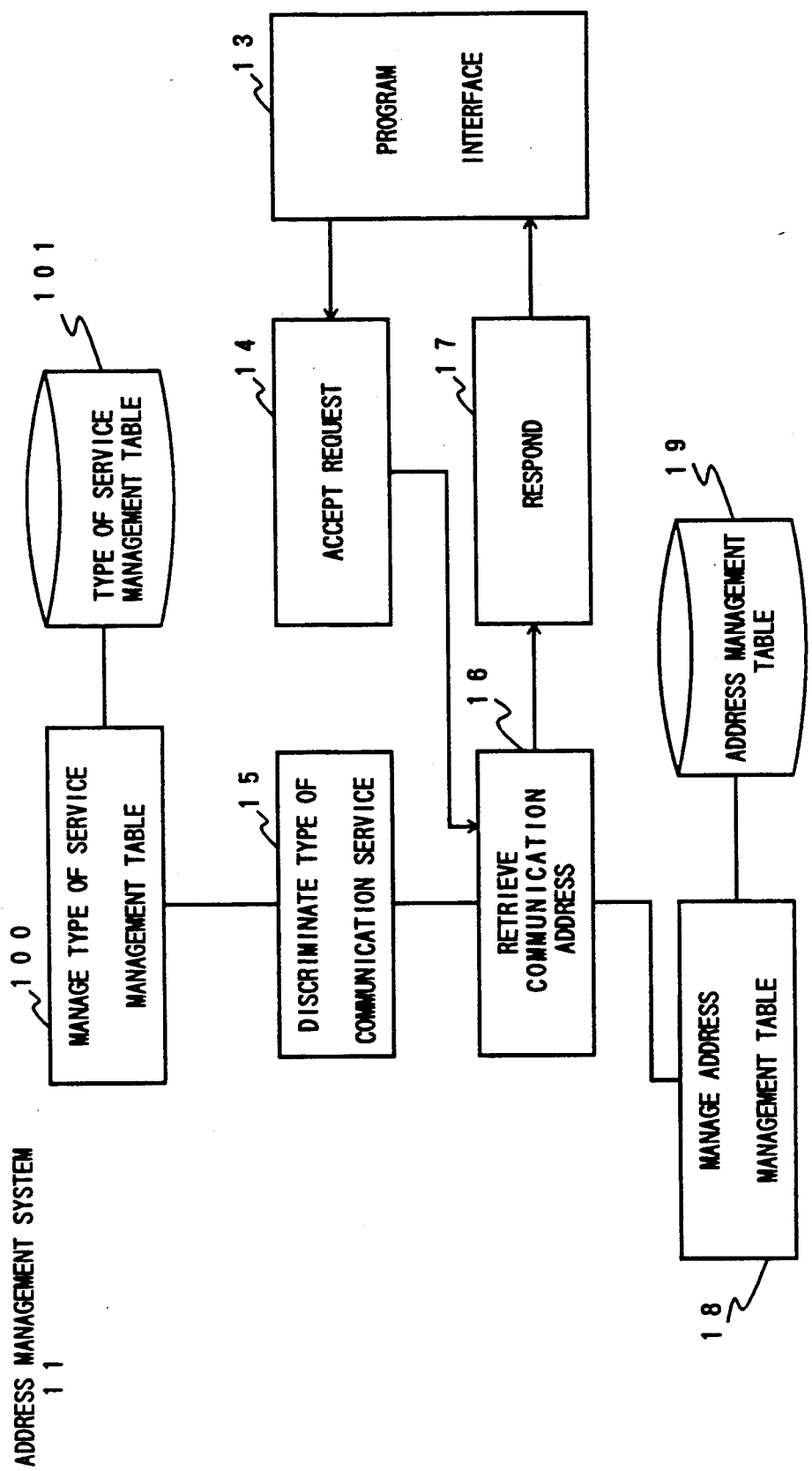
FIG. 2 shows a configuration of the first embodiment of the address management system of the present invention.

FIG. 2 shows a configuration of the address management system 11.

Numeral 13 denotes a program interface unit which exchanges data with the communication application program, numeral 14 denotes a request acceptance unit which accepts various request command from the communication application program and distributes them to various processes, numeral 15 denotes a type of communication service discrimination means which discriminates a type of communication service which the communication application program issuing the request uses, numeral 16 denotes a communication address retrieval unit which retrieves a communication address in accordance with a condition designated by a communication address inquiry request command, numeral 17 denotes a response unit which generates and issues a response command based on the process result to the request command accepted by the request acceptance unit 14, numeral 18 denotes an address management table control unit which controls the access to an address management table 19 which stores names of destination terminals and communication addresses thereof, and numeral 100 denotes a type of service management table control unit which controls the access to a type of service management table 101 which stores names of communication application programs and types of communication services which the programs use.

Figure 3:
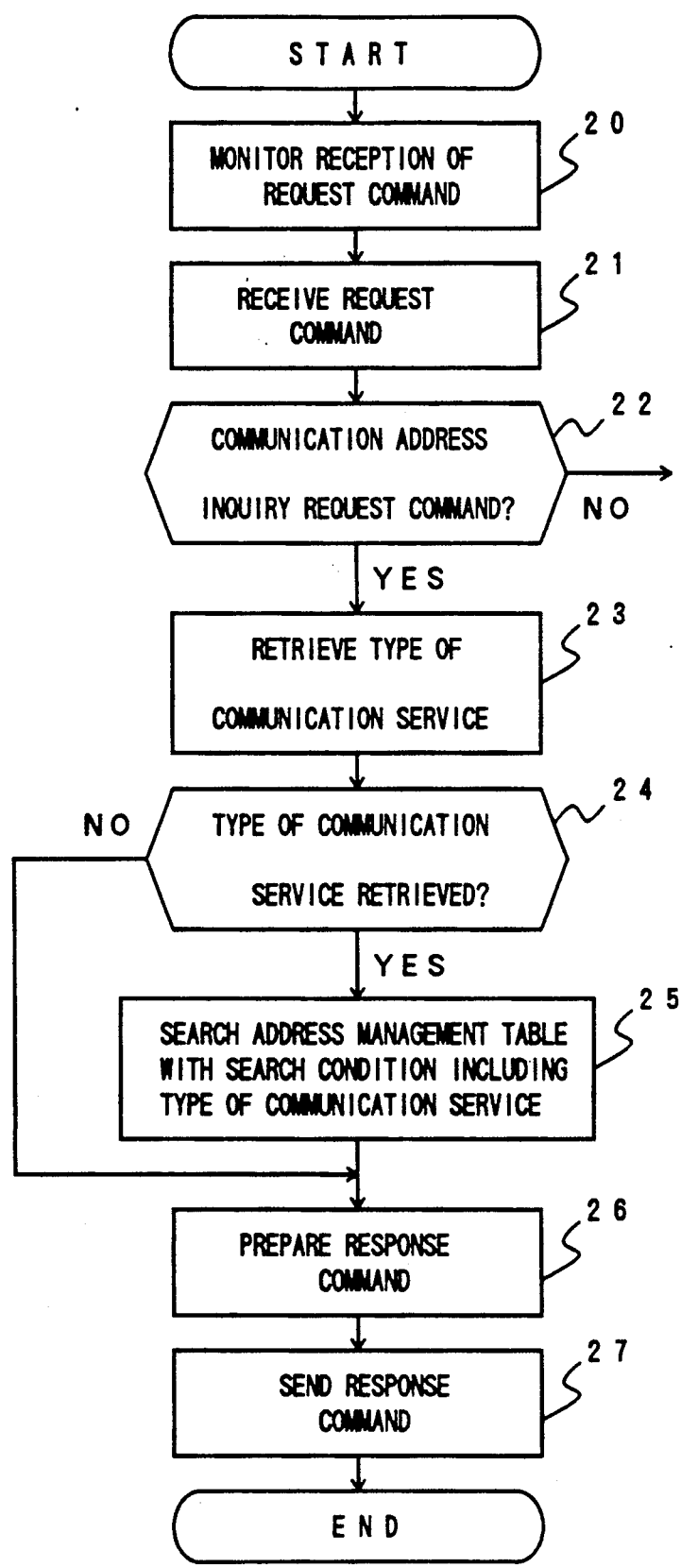
FIG. 3 shows a flow of a process of the address management system of FIG. 2.

FIG. 3 shows a flow of a process from the reception of a communication address inquiry request command by the address management system 11 to the transmission of a response command.

In a step 20, the address management system 11 waits for the reception of the request command. In a step 21, the system 11 receives the request command. In a step 22, whether the received request command is a communication address inquiry request command or not is determined. If the received request command is a communication address inquiry request command, the process proceeds to a step 23. If the received request command is not the communication address inquiry request command, the process proceeds to other step (not shown).

In the step 23, a type of communication service which the communication application program issuing the communication address inquiry request command uses is retrieved from the type of service management table 101.

In a step 24, whether the type of communication service is retrieved or not is determined. If it is retrieved, the process proceeds to a step 25. If it is not retrieved, the process proceeds to a step 26.

In a step 25, the communication address is retrieved from the address management table 19 with a search condition in the communication address inquiry request command together with the retrieved type of communication service.

In a step 26, a response command is prepared based on the retrieval result in the step 24 or 25.

In a step 27, the response command is transmitted to the communication program of the requestor.

FIG. 4 shows a configuration of the type of communication service table 101.

Numeral 32 denotes a column for a name of communication application program in which a name of communication application program is to be registered. Numeral 33 denotes a column for a type of communication service in which the type of communication service which the communication application program uses is to be registered. In addition to the electronic mail program and the telephone control program, a file transfer program is registered as the communication application program.

FIG. 5 shows a configuration of the address management table 19.

Numeral 28 denotes a terminal name column in which a name of communication destination is registered. Numeral 30 denotes a communication address column in which a communication address to be used when the voice communication service is used is to be registered. Numeral 31 denotes a communication address column in which a communication address to be used when the data communication service is used is to be registered.

FIG. 6 shows a communication address inquiry request command 34 which is externally received through the program interface 13. Numeral 35 denotes a request code indicating a communication address inquiry request, numeral 36 denotes a search condition, and numeral 37 denotes a program name of the communication application program issuing the request.

FIG. 7 shows a response command 38 for the communication address inquiry request command 34 which is sent externally through the program interface 13.

Numeral 39 denotes a retrieved communication address.

In the first embodiment, a program communication address for the communication application program such as an electronic mail program 8 or a telephone control program 10 can be obtained by merely designating the terminal name of the communication destination without identifying the type of communication service. (That is, the communication address for the type of communication service which the communication application program uses can be automatically obtained.)

FIG. 8 shows an address management table 19A in which a plurality of communication addresses, for one type of communication service per user, can be registered.

Numeral 93 denotes a user name, numeral 94 denotes user-related information such as a user address, numeral 57 denotes a communication address, and numeral 58 denotes a type of communication service.

Figure 9:
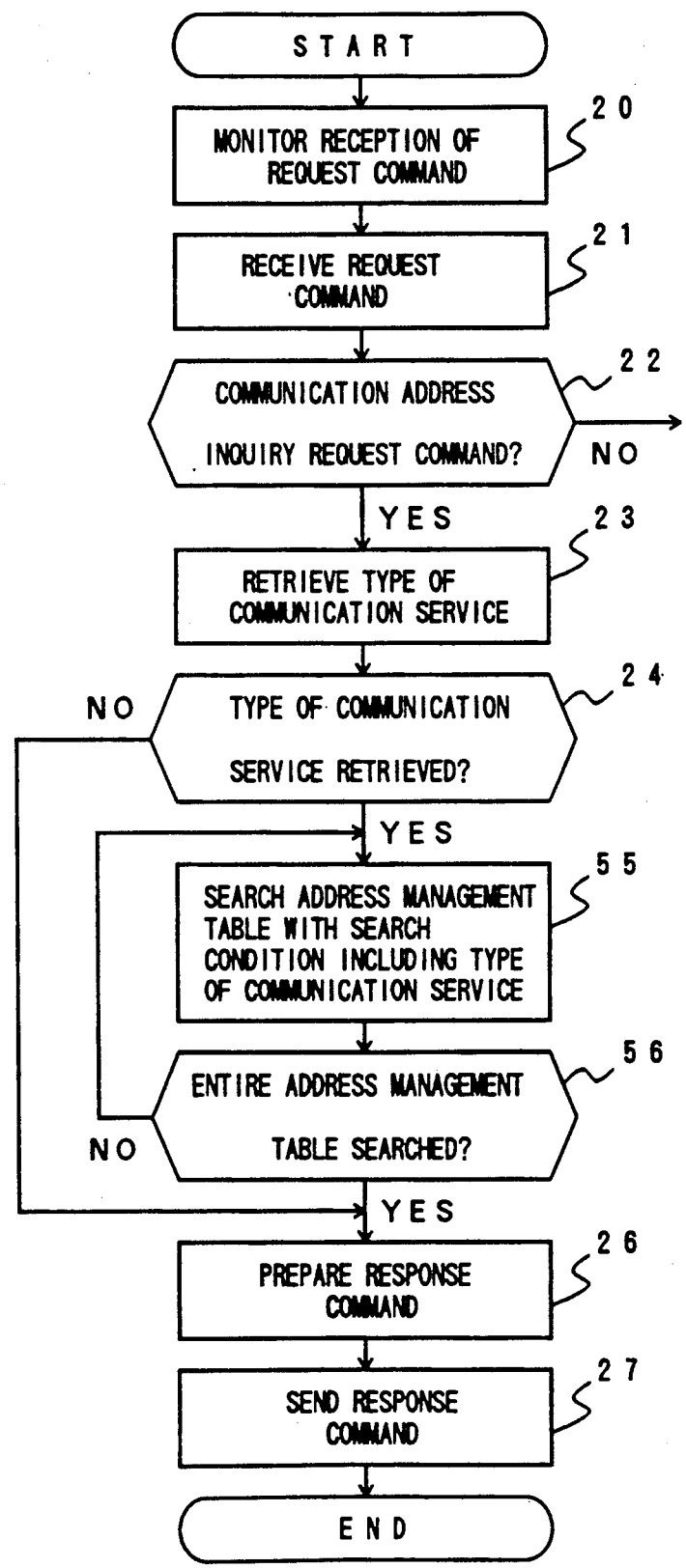
FIG. 9 shows a process flow when the address management table of FIG. 8 is used.

FIG. 9 shows a process flow when the address management table 19A is searched and a plurality of communication addresses are sent back for one communication address inquiry request from the communication application program.

Steps 20-24 are same as the steps 20-24 of FIG. 3.

In a step 55, a communication address is retrieved from the address management table 19A with a search condition in the communication address inquiry request command together with the type of communication service retrieved in the step 24.

In a step 56, the step 55 is repeated until the entire address management table 19A is searched.

In a step 26, a response command is prepared based on the retrieval result in the step 24 or 55.

In a step 27, the response command 38A shown in FIG. 10 is sent to the inquiring communication application program.

In the response command 38A, numeral 59 denotes the number of communication addresses stored in the response command 38A, and numeral 39 denotes a retrieved communication address.

In the embodiment configured as shown in FIGS. 8 to 10, the communication application program can obtain all communication addresses in the corresponding types of communication service by a single communication address inquiry request.

Figure 11:
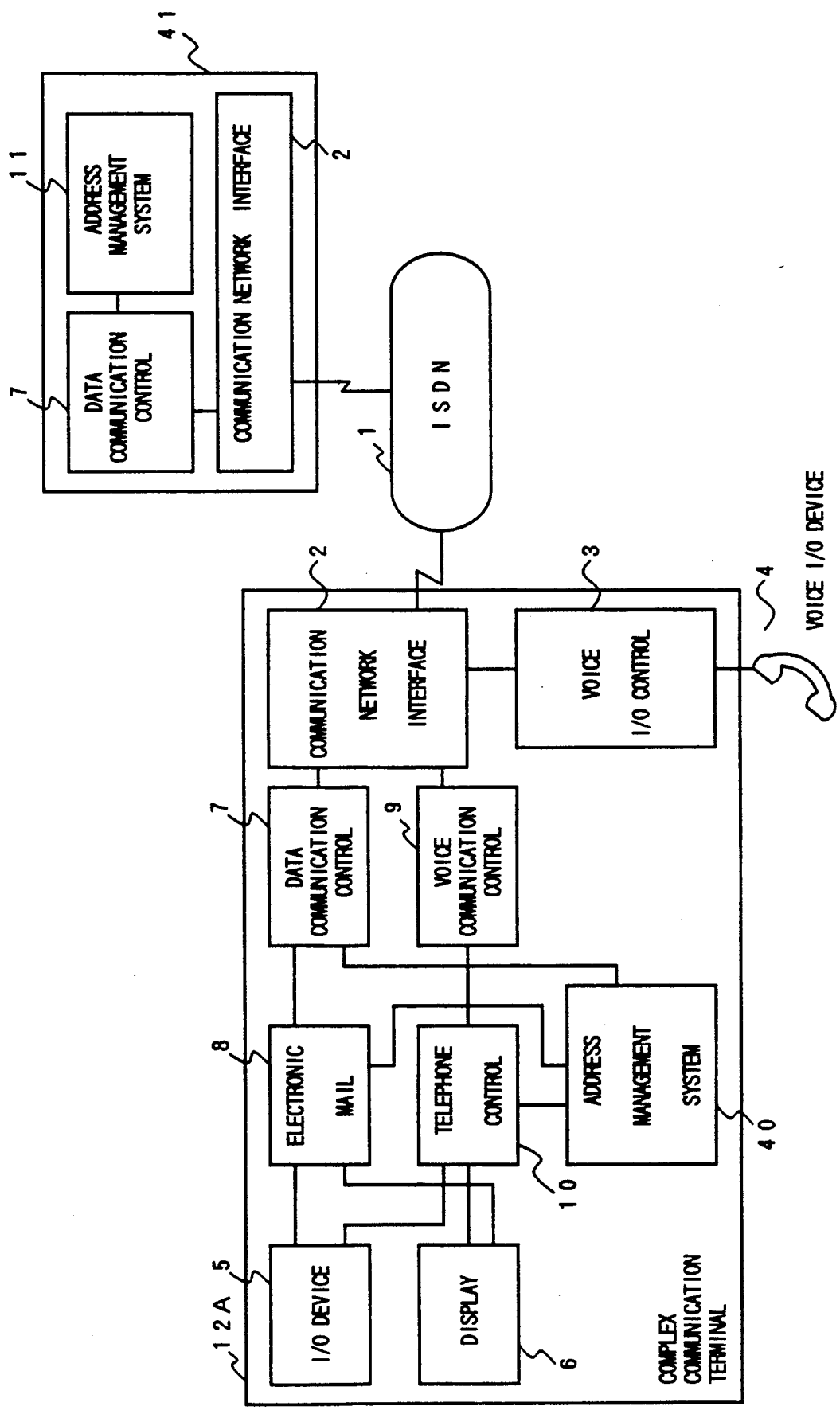
FIG. 11 shows a configuration of a second embodiment of the address management system of the present invention.

FIG. 11 shows a configuration of a second embodiment of the address management system of the present invention. In the second embodiment, a complex communication terminal 12A utilizes an address management system 11 at other terminal 41 through the ISDN network 1.

The complex communication terminal 12A does not have an address management system 11 but has an address management system access unit 40 instead. Other components are identical to those of the complex communication terminal 12 of the first embodiment and they are designated by the like numerals.

Figure 12:
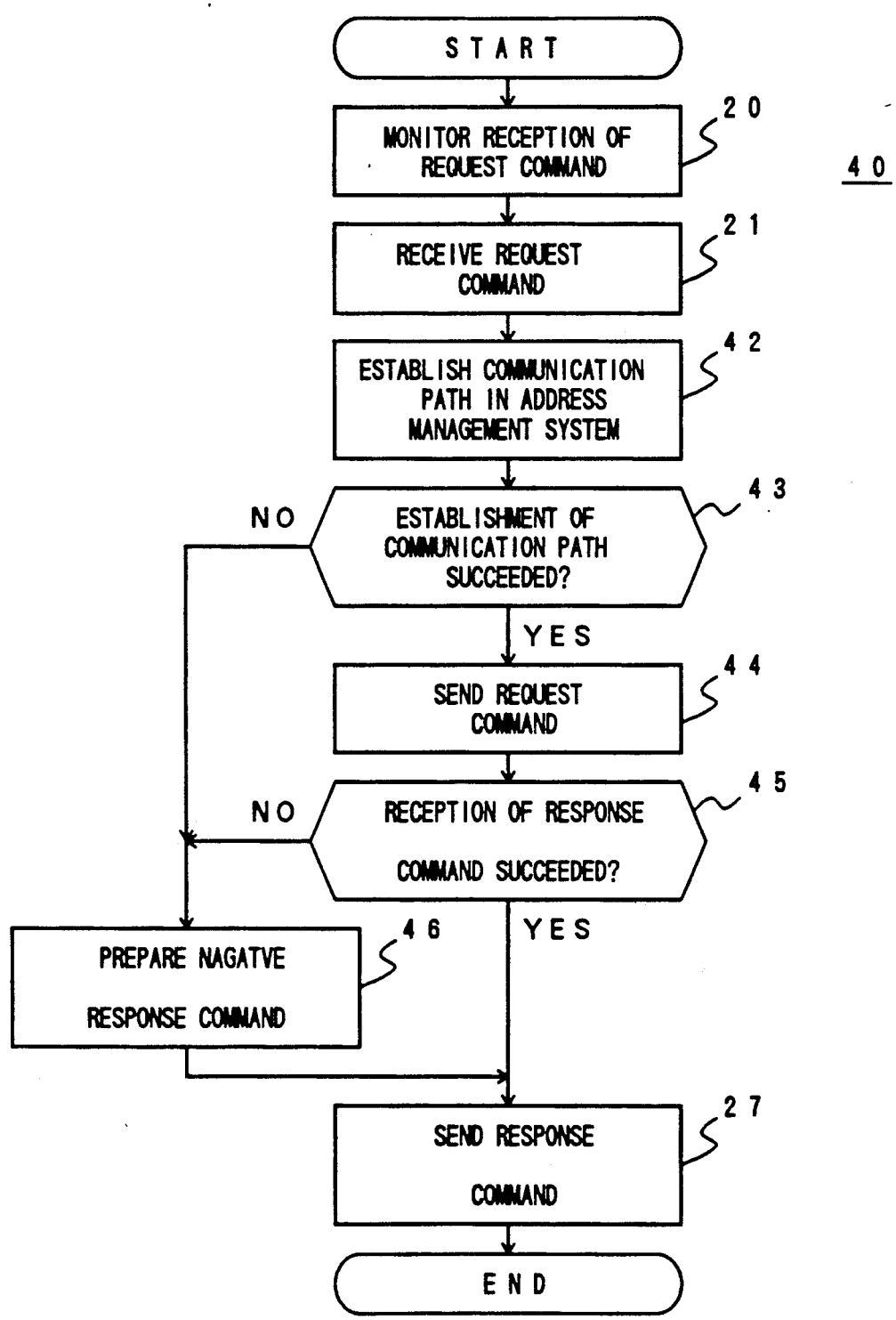
FIG. 12 shows a process flow of the address management system of FIG. 11.

FIG. 12 shows a process flow of the address management system access unit 40.

In a step 20, the unit 40 waits for the reception of a request command.

In a step 21, the unit 40 receives a request command from an application program running on the terminal.

In a step 42, a communication path is established to a terminal 41 in which the address management system 11 is present.

In a step 43, if the communication path has been successfully established, the process proceeds to a step 44, and if it fails, the process proceeds to a step 46.

In the step 44, the request command is sent to the address management system 11 of the terminal 41.

In a step 45, if the response command from the address management system 11 of the terminal 41 has been successfully received, the process is terminated, and if it fails, the process proceeds to the step 46.

In the step 46, a negative response command is prepared.

In a step 27, the response command is sent to the communication application program which issued the request command.

In the second embodiment, a resource can be saved because the address management system 11 of the terminal 41 is shared by a plurality of terminals.

Figure 13:
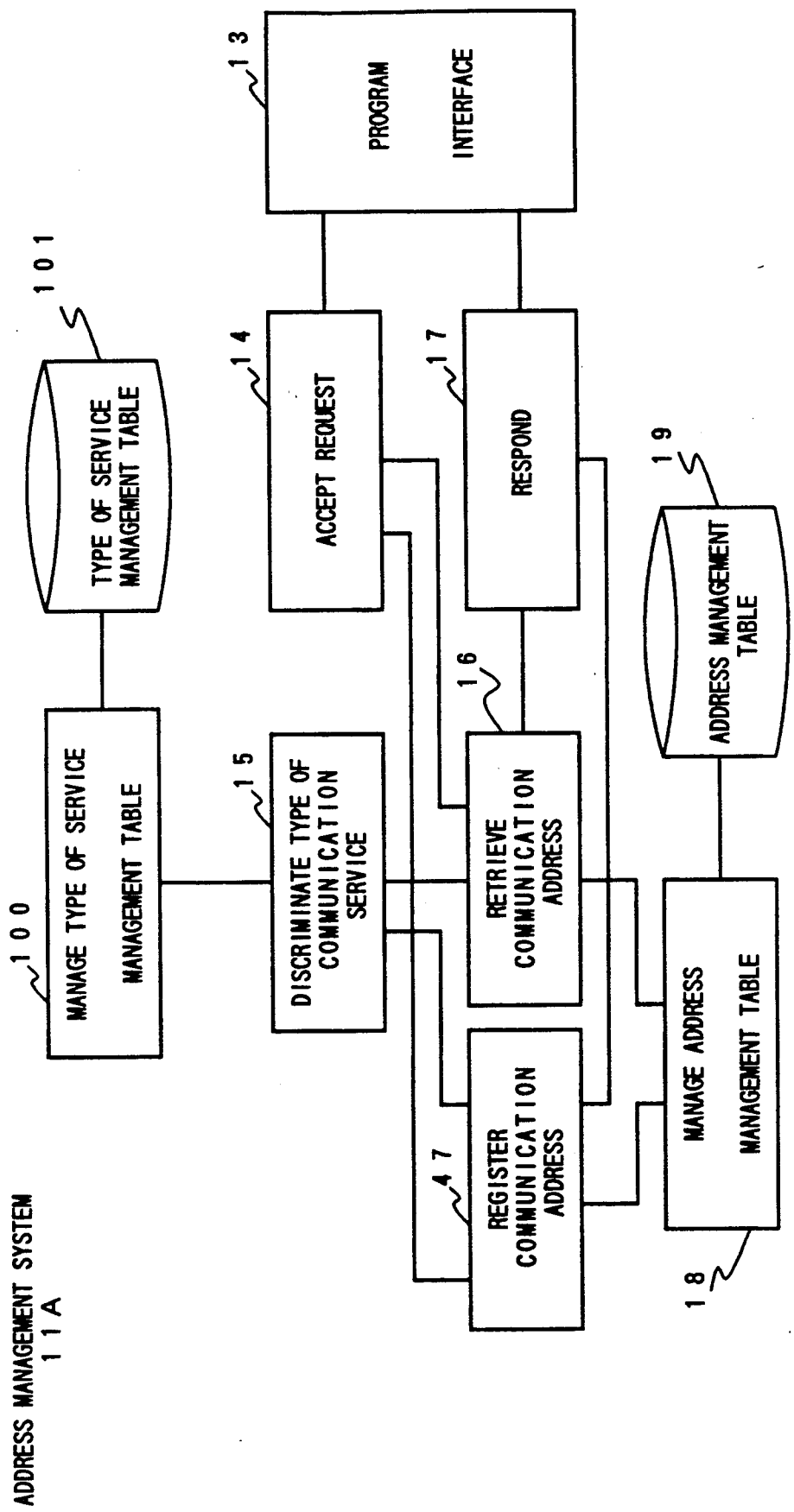
FIG. 13 shows a configuration of a third embodiment of the address management system of the present invention.

FIG. 13 shows an configuration of a third embodiment of the address management system of the present invention.

In the address management system 11A, a communication address registration unit 47 which registers a communication address to the address management table 19 in accordance with a communication address registration request has been added to the address management system 11.

Figure 14:
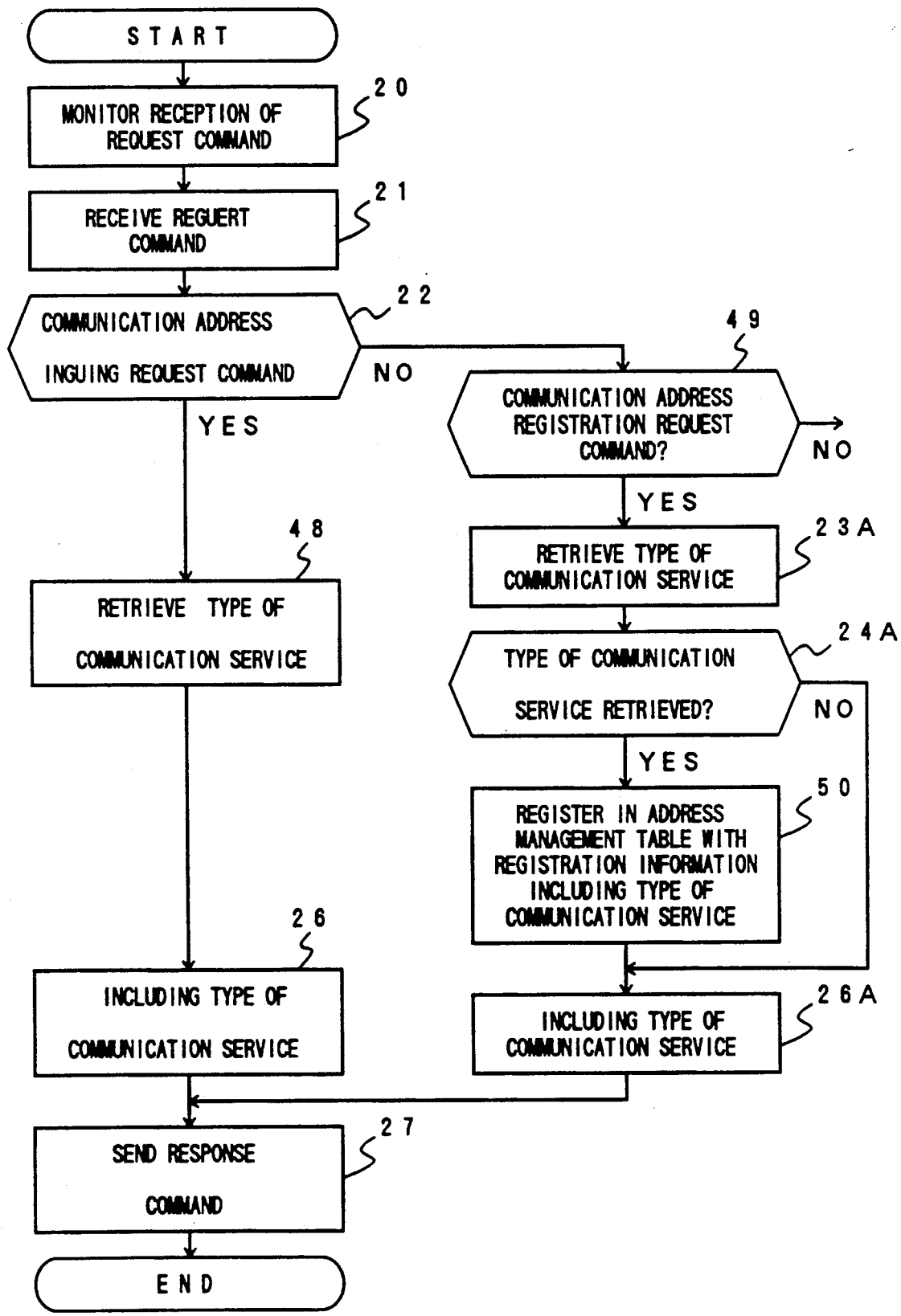
FIG. 14 shows a process flow of the address management system of FIG. 13.

FIG. 14 shows a process flow when the communication application program registers a communication address in the complex communication terminal 12A.

In a step 20, the address management system 11A waits for the reception of a request command.

In a step 21, the address management system 11A receives the request command.

In a step 22, whether the received request command is a communication address inquiry command or not is determined. If the received request command is a communication address inquiry request command, the process proceeds to a step 48. If it is not the communication address inquiry request command, the process proceeds to a step 49.

The step 48 is a retrieval process shown in the steps 23-25 of FIG. 3 or the step 23-56 of FIG. 9.

In a step 26, a response command is prepared based on the retrieval result in the step 48.

On the other hand, in a step 49, whether the received request command is a communication address registration request command or not is determined. If the received request command is the communication address registration request command, the process proceeds to a step 23A. If the received request command is not the communication address registration request command, the process proceeds to other process (not shown).

In a step 23A, the type of communication service which the communication application program issuing the communication address inquiry request command uses is retrieved from the type of service management table 101.

In a step 24A, whether the type of communication service has been retrieved or not is determined. If it has been retrieved, the process proceeds to a step 50. If it has not been retrieved, the process proceeds to a step 26A.

In the step 50, a registration area for the communication address is retrieved from the address management table 19 or 19A with a search condition in the communication address registration request command together with the retrieved type of communication service, and the communication address is registered therein.

In the step 26A, a response command is prepared based on the retrieval result of the step 24A.

In a step 27, the response command is sent to the communication application program which is a requesting terminal.

Figure 15:
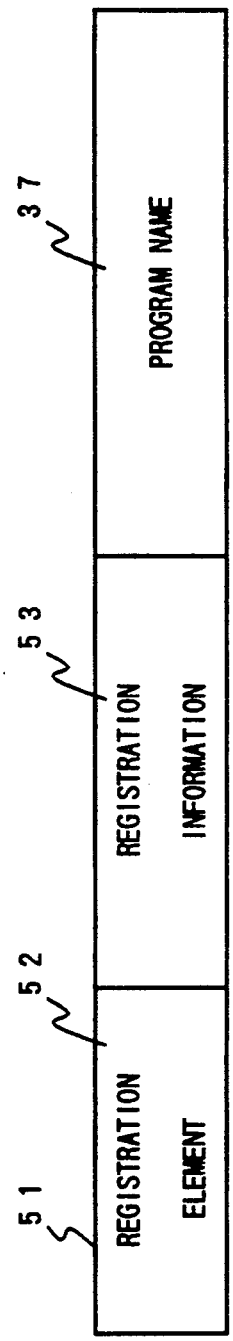
FIG. 15 shows a registration request command.

FIG. 15 shows a configuration of the communication address registration request command 51.

Numeral 52 denotes a request code indicating the communication address registration request. Numeral 53 denotes registration information. Numeral 37 denotes a program name of the communication application program issuing the request.

In the address management system 11A of the third embodiment, the communication address can be registered with the correspondence to the type of communication service which the communication application program uses by merely designating the name of terminal to be registered and the communication address by the communication application program without identifying the type of communication service.

Figure 16:
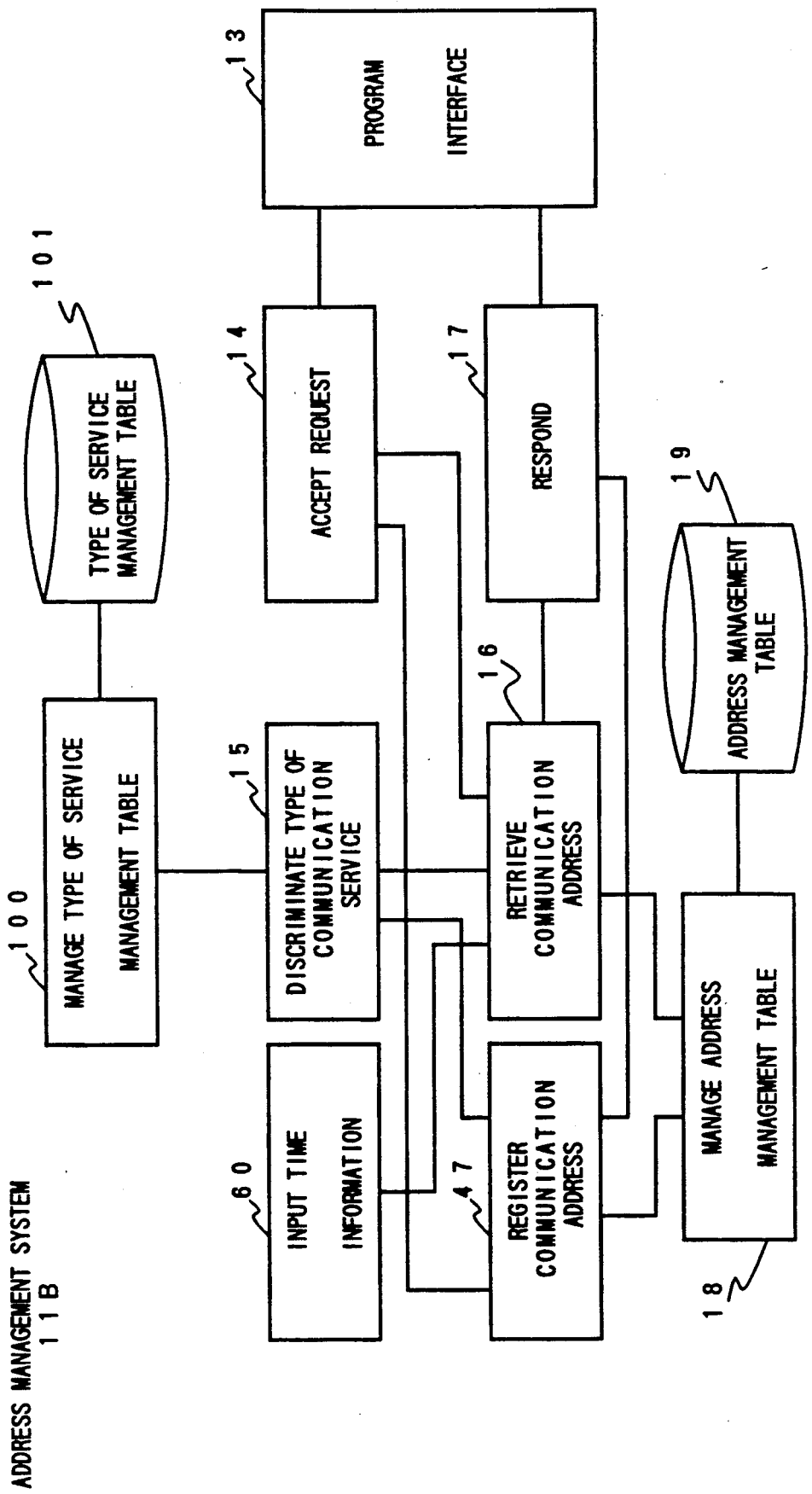
FIG. 16 shows a configuration of a fourth embodiment of the address management system of the present invention.

FIG. 16 shows a configuration of a fourth embodiment of the address management system of the present invention.

In the address management system 11B, a time information input unit 60 for inputting a current time has been added to the address management system 11A.

FIG. 17 shows a configuration of an address management table 19B in which a communication address use time can be registered.

Numeral 93 denotes a user name, numeral 94 denotes user-related information such as a user address, numeral 57 denotes a communication address, numeral 58 denotes a type of communication address and numeral 63 denotes an available time.

Figure 18:
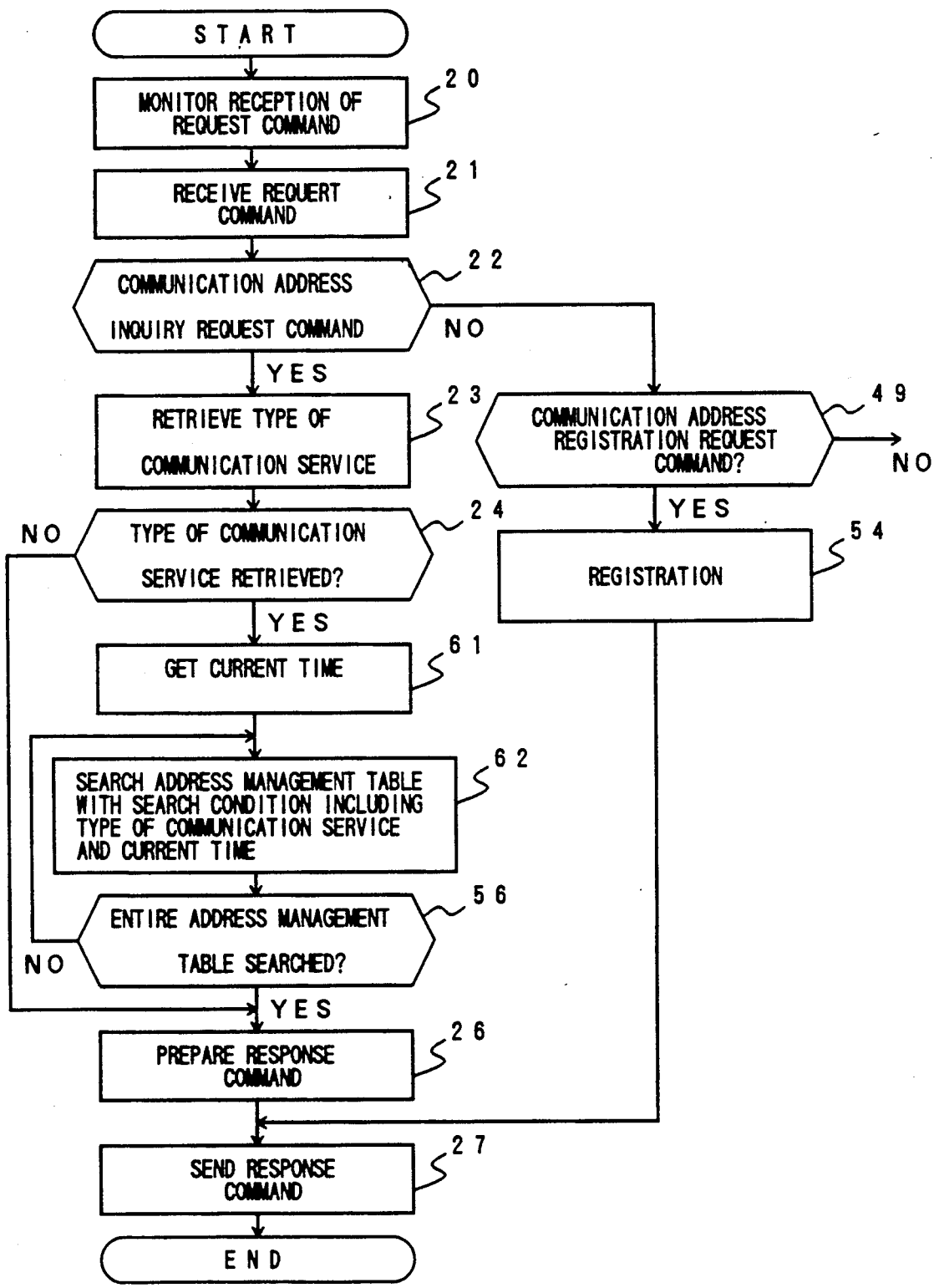
FIG. 18 shows a process flow of the address management system of FIG. 16.

FIG. 18 shows a process flow when the address management table 19B is searched in the address management system 11B and a communication address which is currently available to the user, which changes from time to time, is sent back.

Steps 20–24 are identical to the steps 20–24 of FIG. 3.

In a step 61, a current time is read from the time information input unit 60.

In a step 62, a communication address is retrieved from the address management table 19B with a search condition in the communication address inquiry request command together with the type of communication service retrieved in the step 24 and the current time read in the step 61.

In a step 56, the step 62 is repeated until the entire address management table 19B has been searched.

In a step 26, a response command is prepared based on the retrieval result of the step 24 or 62.

In a step 27, the response command is sent back to the communication program of the inquiring terminal.

A step 49 is idential to the step 49 of FIG. 14.

A step 54 is identical to the steps 23A–26A of FIG. 14.

In the address management system 11B of the fourth embodiment, a proper communication address can be obtained by merely designating the terminal name of the destination terminal by the communication application program without identifying the change in time of the communication address of the user or the currently available communication address.

Figure 19:
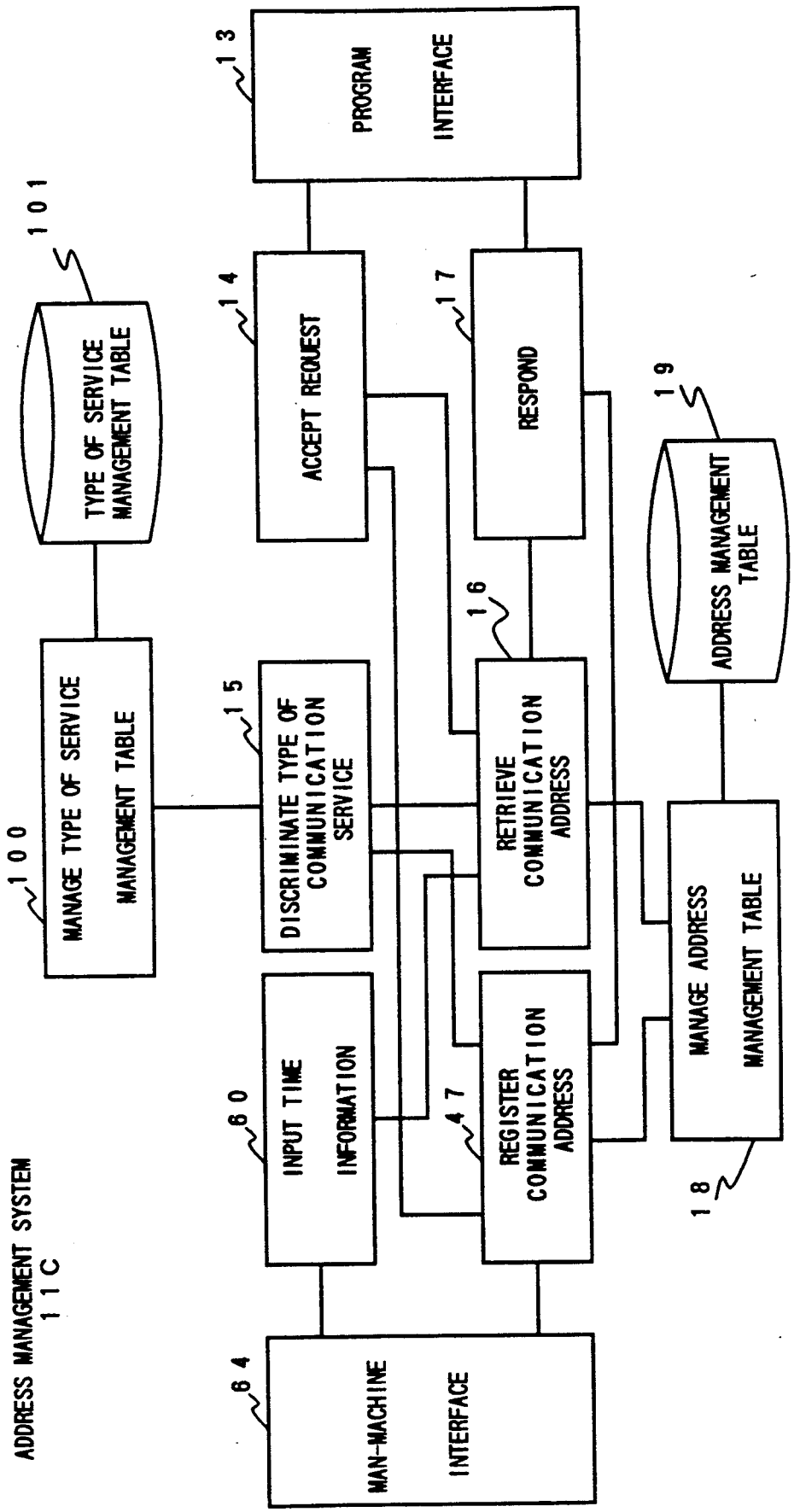
FIG. 19 shows a configuration of a fifth embodiment of the address management system of the present invention.

FIG. 19 shows a configuration of a fifth embodiment of the address management system of the present invention.

In the address management system 11C, a man-machine interface unit 64 for accepting a request from a user and providing a result of process to the user has been added to the address management system 11B.

Figure 20:
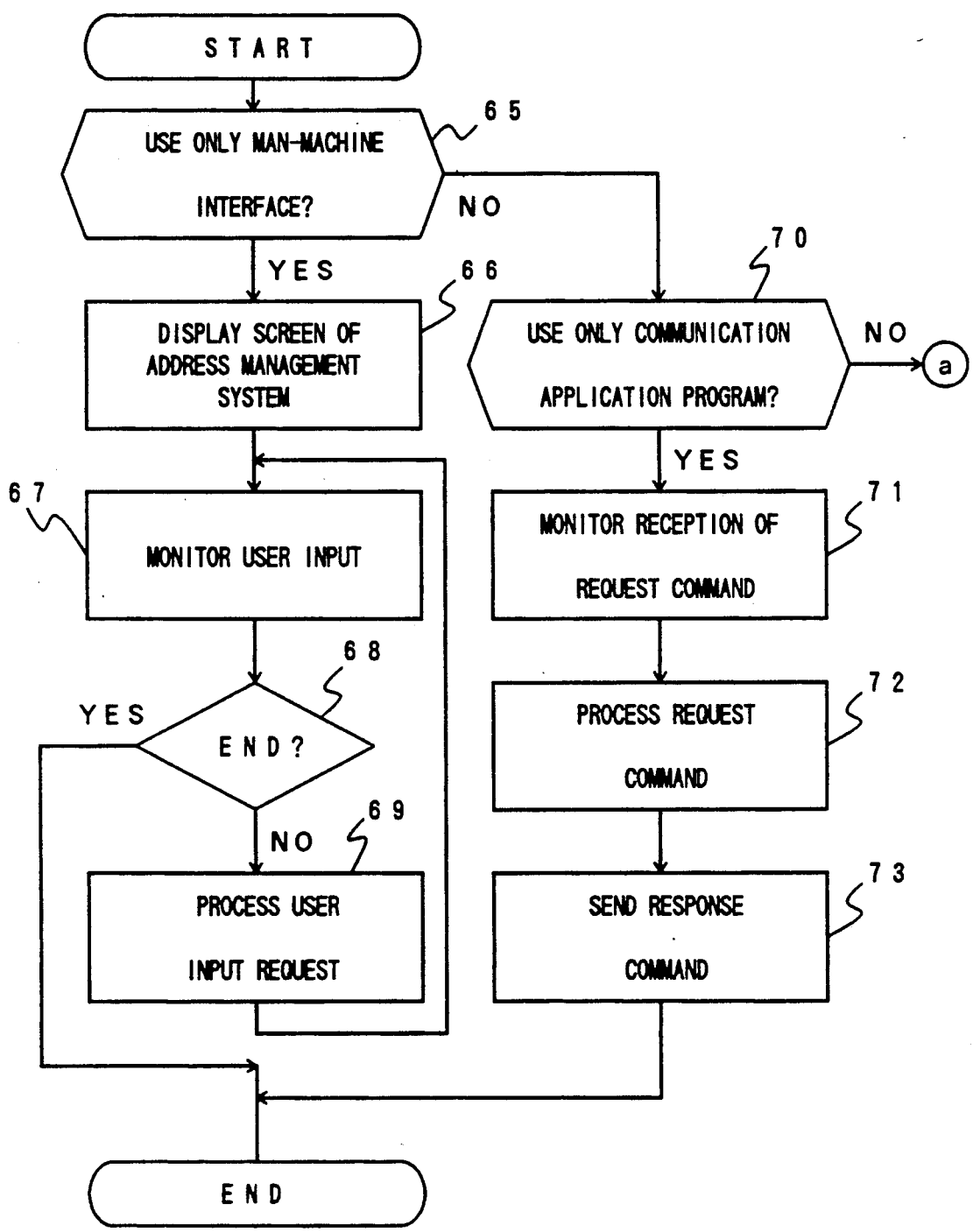
FIG. 20 shows a process flow of the address management system of FIG. 19.
Figure 21:
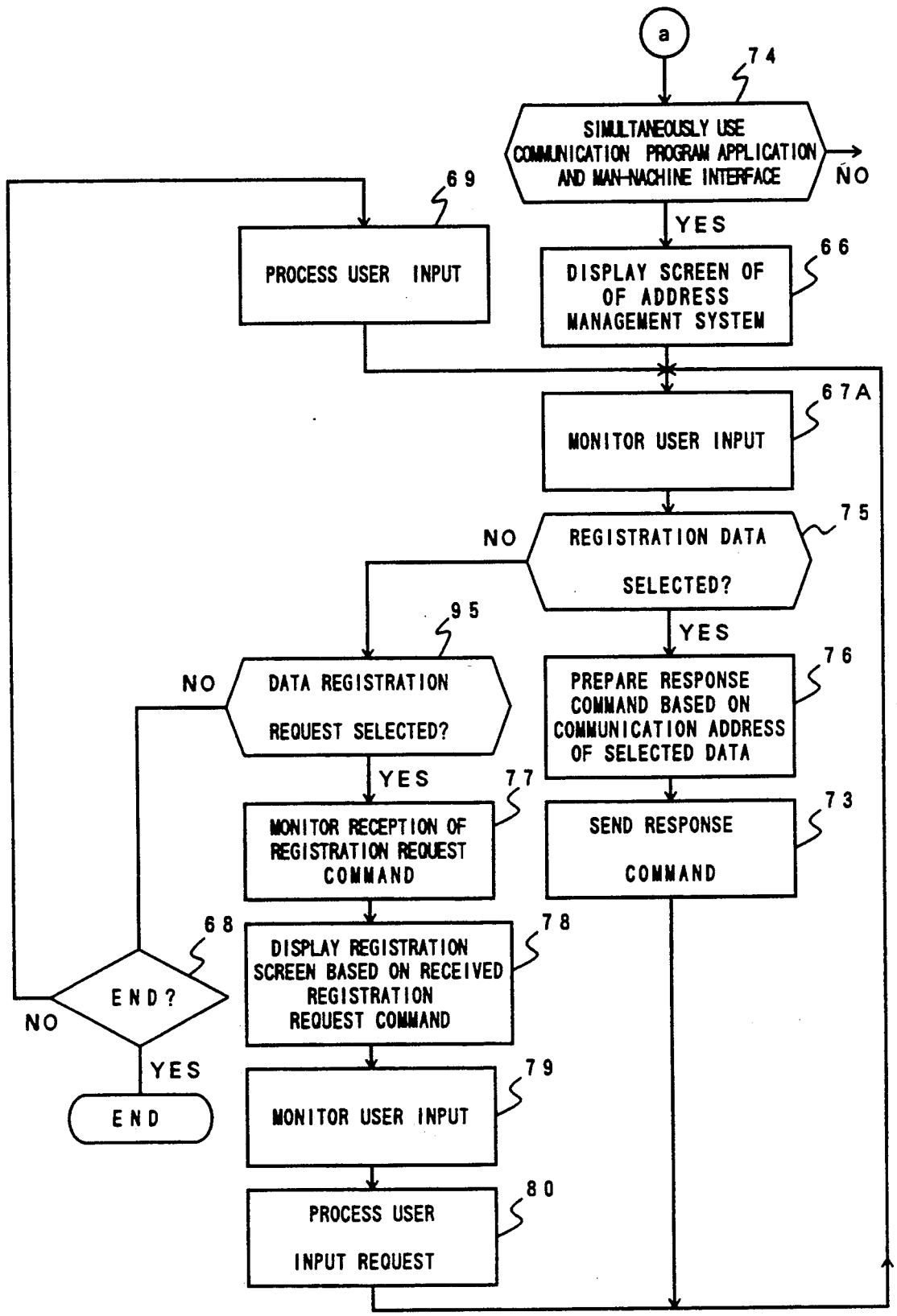
FIG. 21 shows a process flow which is a continuation from the process flow of FIG. 20.

FIGS. 20 and 21 show a process flow in the address management system 11C.

In a step 65, whether an operation mode selected by a user when the address management system is started is "use only man-machine interface" or not is determined, and if it is, the process proceeds to a step 66, and if it is not, the process proceeds to a step 70.

In a step 66, an address management system utilization display screen is displayed.

In a step 67, an entry by the user of a process request such as the correction or deletion of the communication address data registered in the address management table 19 or the registration of new communication address data is monitored.

In a step 68, if the user input request is other than "termination", the process proceeds to a step 69, and if it is "termination", the process is terminated.

In the step 69, the user input request is processed.

On the other hand, in a step 70, whether the selected operation mode is "use only communication application program interface" or not is determined, and if it is, the process proceeds to a step 71, and if it is not, the process proceeds to a step 74.

In the step 71, the reception of a request command from the communication application program is monitored.

In a step 72, the received request command is processed.

In a step 73, a response command is sent.

On the other hand, in a step 74, whether the selected operation mode is "simultaneous use of communication application program interface and man-machine interface" or not is determined, and if it is, the process proceeds to a step 66, and if it is not, the process proceed to other step (not shown).

In the step 66, an address management system utilization display screen is displayed.

In a step 67A, a communication address which the communication application program is to use is selected from the communication address data registered in the address management table 19 and the entry by a user of a process request such as the correction or deletion to the communication address data registered in the address management table 19 or the registration of new communication address data is monitored.

In a step 75, whether the user has selected data in the communication address data registered in the address management table 19 in the step 67 or not is determined, and if it has been selected, the process proceeds to a step 76, and if it has not, the process proceeds to a step 95.

In the step 76, a response command is prepared based on the communication address of the selected registration data.

In a step 73, the response command is sent to the communication application program.

On the other hand, in the step 95, whether the user has selected the registration of new communication address data or not is determined, and if it has, the process proceeds to a step 77, and if it has not, the process proceeds to a step 68.

In the step 77, the reception of a communication address registration request command from the communication application program is monitored.

In a step 78, a registration process screen is displayed based on registration information 53 in the communication address registration request command 51.

In a step 79, the entry by the user of an addition, correction or registration request to the information displayed on the registration process screen is monitored.

In a step 80, the request entered by the user is processed.

On the other hand, if the user input request is other than "termination", the process proceeds to a step 69, and if it is "termination", the process is terminated.

In the step 69, the user input request is processed.

In the address management system 11C of the fifth embodiment, the utilization of the address management system 11C can be selected from the use of only the communication application program interface, the use of only the man-machine interface and the simultaneous use of the communication application program interface and the man-machine interface so that an operation mode which most fits to the situation is available.

FIG. 22 shows a screen display where the telephone control program 10 requests "simultaneous use of communication application program interface and man-machine interface" to the address management system 11C.

Numeral 93 denotes a display screen of the telephone control program 10.

Numeral 88 denotes a display screen of the address management system 11C. Numeral 89 denotes a user name, and numeral 90 denotes a communication address.

FIG. 23 shows a screen display when the electronic mail program 8 requests "simultaneous use of communication application program interface and man-machine interface" to the address management system 11C.

Numeral 91 denotes a display screen of the electronic mail program 8.

Numeral 88 denotes a display screen of the address management system 11C. Numeral 89 denotes a user name and numeral 92 denotes a communication address.

Figure 24:
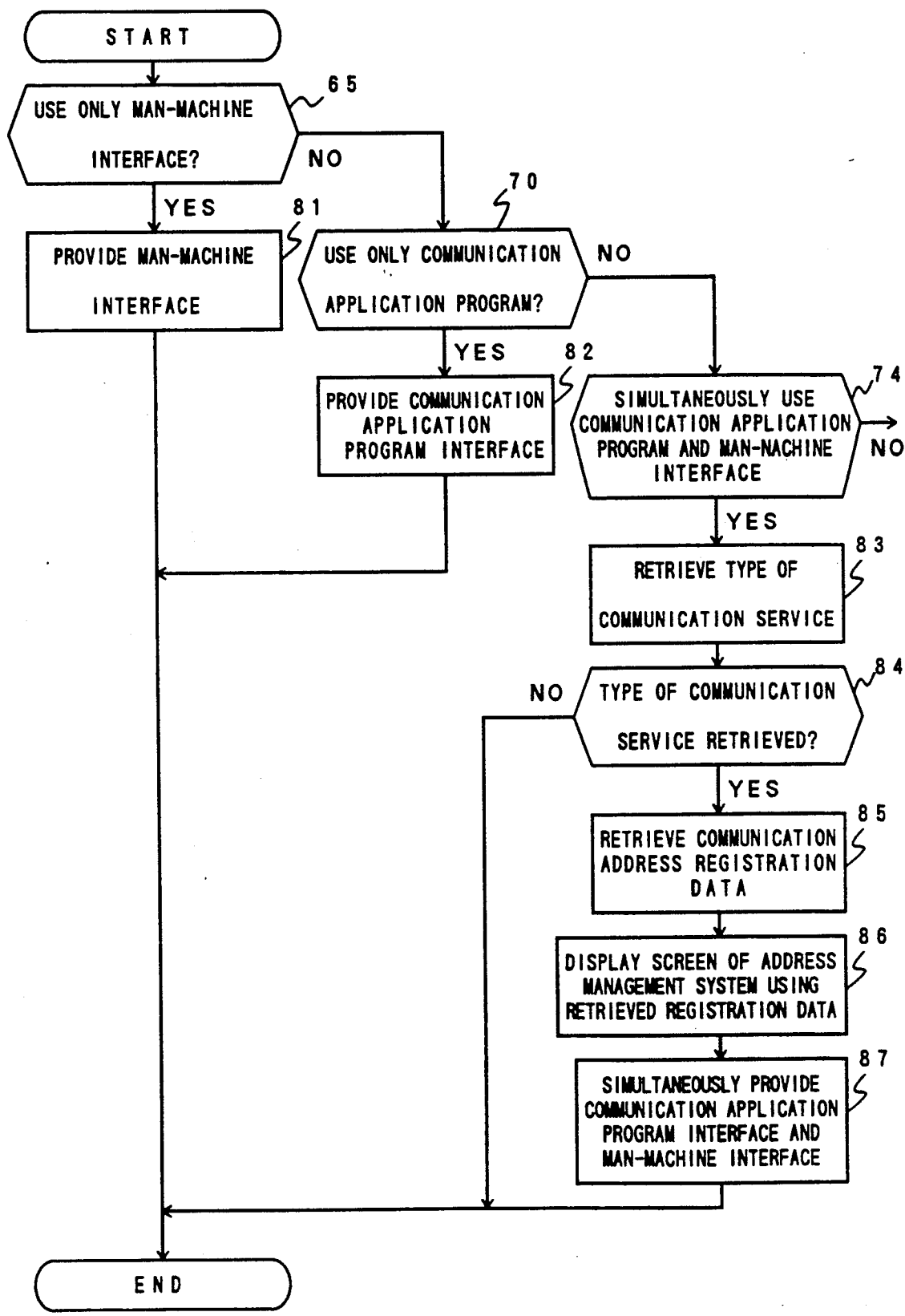
FIG. 24 shows another process flow of the address management system of FIG. 19.

FIG. 24 shows another process flow in the address management system 11C.

In a step 65, whether the selected operation mode is "use only man-machine interface" or not is determined, and if it is, the process proceeds to a step 81, and if it is not, the process proceeds to a step 70.

The step 81 is identical to the steps 66–69 of FIG. 20.

On the other hand, in the step 70, whether the selected operation mode is "use only the communication application program interface" or not is determined, and if it is, the process proceeds to a step 82, and if it is not, the process proceeds to a step 74.

The step 82 is identical to the steps 71–73 of FIG. 20.

On the other hand, in the step 74, whether the selected operation mode is "simultaneous use of communication application program interface and man-machine interface" or not is determined, and if it is, the process proceeds to a step 83, and if it is not, the process proceeds to other step.

In the step 83, a type of communication service which the communication application program issuing the request uses is retrieved.

In a step 84, if the type of communication service has been retrieved in the step 83, the process proceeds to a step 85, and if it has not, the process is terminated.

In a step 85, data in which the communication address of the retrieved type of communication service is retrieved.

In a step 86, a utilization screen of the address management system is displayed by using the registration data retrieved in the step 85.

The step 87 is identical to the series of steps 67A–95 of FIG. 21.

In accordance with the process of FIG. 24, one address management system 11C can provide all the man-machine interface that can be provided by the address management systems for the communication services described previously.

In accordance with the address management system of the present invention, a plurality of communication services and a plurality of communication address inquiry requestors can be integrally processed, and the communication address inquiry requestor can obtain a communication address for a proper communication service by merely designating a communication destination without identifying the type of communication service of the communication destination.

We claim:

1. A communication address management system comprising:
    storage means for storing identification information of a plurality of communication destinations, and data relating to types of communication services available to the communication destinations and communication addresses therefor;
    acceptance means for accepting a communication address inquiry request from a communication address inquiry requestor;
    discrimination means for discriminating a type of communication service available to the communication address inquiry requestor based on contents of the accepted communication address inquiry request;
    retrieval means for searching the data in said storage means based on contents of the identification information in the accepted communication address inquiry request and the discriminated type of communication service to retrieve a desired communication address; and
    response means for sending the retrieved communication address back to the communication address inquiry requestor.

2. A communication address management system according to claim 1, wherein said acceptance means further accepts a communication address registration request from a communication address registration requestor, said discrimination means discriminates a type of communication service which said communication address registration requestor uses based on contents of the accepted communication address registration request, and said communication address management system further comprises means for registering a desired communication address in a communication address registration area in said storage means in accordance with identification information in the accepted communication address registration request and the discriminated type of communication service.

3. A communication address management system according to claim 1, wherein said storage means stores a plurality of communication addresses for one of the types of communication services of one of the communication destinations, said communication address retrieval means searches data in said storage means to retrieve a plurality of communication addresses, and said response means sends the plurality of communication addresses retrieved by said retrieval means back to the communication address inquiry requestor.

4. A communication address management system according to claim 2, wherein said storage means stores a plurality of communication addresses for one of the types of communication services of one of the communication destinations, said communication address retrieval means searches data in said storage means to retrieve a plurality of communication addresses, and said response means sends the plurality of communication addresses retrieved by said retrieval means back to the communication address inquiry requestor.

5. A communication address management system according to claim 1, wherein said storage means stores data with communication addresses associated with available time for each of the stored communication addresses, and said communication address retrieval means retrieves a desired communication address from the communication addresses available at the time of the communication address inquiry request.

6. A communication address management system according to claim 1, wherein said storage means stores data with communication addresses associated with available time for each of the stored communication addresses, and said communication address retrieval means retrieves a desired communication address from the communication addresses available at the communication time designated by identification information in the communication address inquiry request.

7. A communication address management system according to claim 3, wherein said storage means stores data with communication addresses associated with available time for each of the stored communication addresses, and said communication address retrieval means retrieves a plurality of desired communication addresses from the communication addresses available at the time of the communication address inquiry request.

8. A communication address management system according to claim 3, wherein said storage means stores data with communication addresses associated with available time for each of the stored communication addresses, and said communication address retrieval means retrieves a plurality of desired communication addresses from the communication addresses available at the communication time designated by identification information in the communication address inquiry request.

9. A communication address management system according to claim 4, wherein said storage means stores data with communication addresses associated with available time for each of the stored communication addresses, and said communication address retrieval means retrieves a plurality of desired communication addresses from the communication addresses available at the time of the communication address inquiry request.

10. A communication address management system according to claim 4, wherein said storage means stores data with communication addresses associated with available time for each of the stored communication addresses, and said communication address retrieval means retrieves a plurality of desired communication addresses from the communication address available at the communication time designated by identification in the communication address inquiry request.

11. A communication address management system according to claim 1, further comprising man-machine interface means for displaying the communication address retrieved by said communication address retrieval means on a screen for prompting a user to select the displayed communication address and sending the selected communication address to said response means, wherein said response means sends the communication address sent from said man-machine interface means back to the communication address inquiry requestor.

12. A communication address management system according to claim 11, wherein an operation mode in which the communication address retrieved by said communication address retrieval means is sent to said response means through processing by said man-machine interface means, and an operation mode in which the communication address retrieved by said communication address retrieval means is directly sent to said response means are selectively used.

13. A communication address management system comprising:
first and second terminals connected through a communication network;
said first terminal having communication address management system access means including
acceptance means for accepting a communication address inquiry request from a communication address inquiry requestor,
connection means for connecting said first terminal with said second terminal through said communication network,
transmission means for transmitting the communication address inquiry request to said second terminal,
reception means for receiving a response from said second terminal, and
response means for sending the response from said second terminal back to the communication address inquiry requestor; and
said second terminal including
storage means for storing identification information of a plurality of communication destinations, and data for types of communication services available to the communication destinations and associated communication addresses,
acceptance means for accepting the communication address inquiry request from said first terminal,
discrimination means for discriminating a type of communication service which the communication address inquiry requestor uses based on contents of the accepted communication address inquiry request,
retrieval means for searching data in said storage means to retrieve a desired communication address in accordance with identification information in the accepted communication address inquiry request and the discriminated type of communication service, and
response means for sending the retrieved communication address to said first terminal.

14. A communication terminal comprising:
a communication network interface connected to a communication network; and
address management means including
storage means for storing identification information of a plurality of communication destinations, and data for types of communication services available for the communication destinations and associated communication addresses,
acceptance means for accepting a communication address inquiry request from a communication address inquiry requestor executing a communication application program, through said communication network interface,
discrimination means for discriminating a type of communication service which the communication address inquiry requestor uses based on contents of the accepted communication address inquiry request, retrieval means for searching data in said storage means to retrieve a desired communication address in accordance with identification information in the accepted communication address inquiry request and the discriminated type of communication service, and response means for sending the retrieved communication address to the communication address inquiry requestor through said communication network interface.

15. A method for managing a communication address comprising the steps of:

accepting a communication address inquiry request from a communication address inquiry requestor;

discriminating a type of communication service which the communication address inquiry requestor uses based on contents of the accepted communication address inquiry request;

searching stored identification information of a plurality of communication destinations, and data for types of communication services available to the communication destinations and associated communication addresses in response to said searching, retrieving a desired communication address in accordance with identification information in the accepted communication address inquiry request and the discriminated type of communication service; and sending the retrieved communication address back to the communication address inquiry requestor.

* * * * *